United States Patent
Kimelman (10) Patent No.: US 10,949,352 B1
(45) Date of Patent: Mar. 16, 2021

(54) DATA PROCESSING SYSTEM HAVING A SHARED CACHE

(71) Applicant: NXP USA, Inc., Austin, TX (US)

(72) Inventor: Paul Kimelman, Alamo, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/810,136

(22) Filed: Mar. 5, 2020

(51) Int. Cl.
*G06F 12/00* (2006.01)
*G06F 12/084* (2016.01)
*G06F 12/0806* (2016.01)
*G06F 12/10* (2016.01)

(52) U.S. Cl.
CPC ........ *G06F 12/084* (2013.01); *G06F 12/0806* (2013.01); *G06F 12/10* (2013.01); *G06F 2212/60* (2013.01)

(58) Field of Classification Search
CPC .... G06F 12/084; G06F 12/0806; G06F 12/10; G06F 2212/60
See application file for complete search history.

(56) References Cited

U.S. PATENT DOCUMENTS

2006/0004963 A1* 1/2006 Mattina ................. G06F 12/121
711/130

* cited by examiner

*Primary Examiner* — Shawn X Gu (57) ABSTRACT

A cache is shared by a first and second processor, and is divided into a first cache portion corresponding to a first requestor identifier (ID) and a second cache portion corresponding to a second requestor ID. The first cache portion is accessed in response to memory access requests associated with the first requestor ID, and the second cache portion is accessed in response to memory access requests associated with the second requestor ID. A memory controller communicates with a shared memory, which is a backing store for the cache. A corresponding requestor ID is received with each memory access request. Each memory access request includes a corresponding access address identifying a memory location in the shared memory and a corresponding index portion, wherein each corresponding index portion selects a set in a selected cache portion of the first and second cache portions selected based on the received corresponding requestor ID.

20 Claims, 4 Drawing Sheets

DATA PROCESSING SYSTEM HAVING A SHARED CACHE

BACKGROUND

Field

This disclosure relates generally to a data processing system, and more specifically, to a data processing system having a shared cache.

Related Art

A data processing system can have multiple processors or cores. Furthermore, a hypervisor can be used to run different virtual machines, in which each processor can be further divided into two or more virtual cores or spaces. Each of these processors, or virtual cores of a processor, is capable of running its own applications, however it may be important that the applications maintain freedom of interference. Freedom of interference generally relates to time, in which the impact on time can manifest itself in various ways, such as when another application is using a shared resource or when the time of an operation is otherwise not within a bounded time. That is, while the operation of an application may actually be correct and not erroneous, the time for performing that operation may be made to exceed an expected maximum amount of time, thus negatively impacting freedom of interference for the application. This is especially problematic for real-time applications or safety applications.

For example, a shared memory of the data processing system may result in operations which are not bounded in time. While access through a processor's own private caches (e.g. its level 1 (L1) and level 2 (L2) caches) can be bounded in which the maximum time to complete an operation is known, accesses to a shared level 3 (L3) cache, which is shared among the processors or virtual cores, may not be. This may be the case for misses to the L3 cache, requiring accesses to the shared external memory (the backing store for the L3 cache), in which the external memory is typically much slower or may be processing the miss from another application accessing the shared L3 cache. If a real-time application results in such a miss in the L3 cache, the response time may be too long, causing interference for, and thus impacting reliability of, the real-time application or of any application waiting its turn to access the shard external memory. Therefore, a need exists for a data processing system having a shared L3 cache which provides improved freedom of interference to applications running on the data processing system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system having multiple processors or multiple virtual cores, cache slotting is implemented for the shared L3 cache in order to maintain improved freedom of interference for applications running in the data processing system. In one embodiment, the cache is slotted into multiple portions, wherein each portion is accessed based on a requestor identifier (ID) for the application or domain in which the application is running. A cache can be slotted into any number of portions having a power of 2 number of sets or indexes. Each slotted portion is smaller than the full L3 cache, including fewer entries, thus requiring fewer index bits for the address lookup in the L3 cache but resulting in longer tags. With the slotted L3 cache, each application (or each processor or domain) running in the data processing system can be assigned a separate cache portion so as not to interfere with other applications accessing different portions of the L3 cache. By splitting the incoming address into different address portions, as well as using the requestor ID, portions of the cache can be accessed without modification of the cache array. In order to maintain freedom of interference, a priority scheme can also be used so that access to particular cache portions receive priority over accesses to other cache portions. This priority schemed, as will be discussed below, may be used during line fill operations of the L3 cache.

Figure 1:
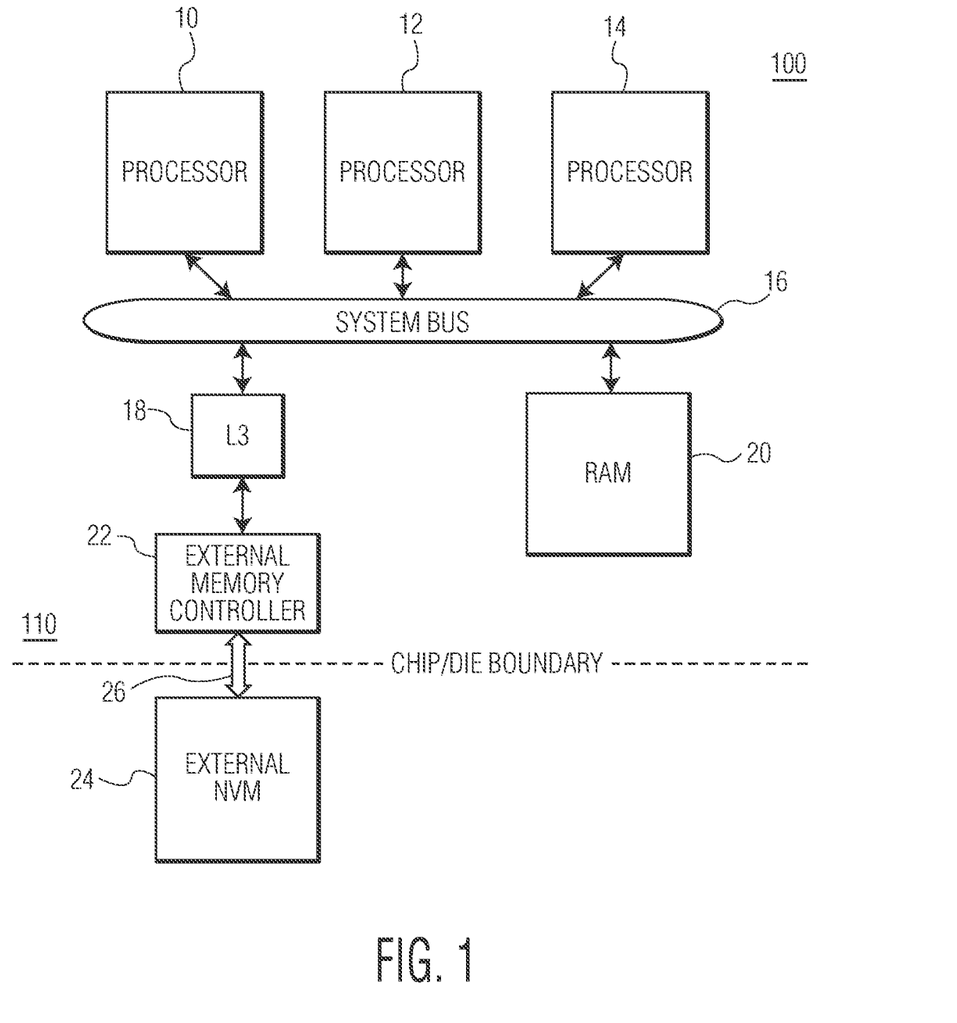
FIG. 1 illustrates, in block diagram form, a data processing system having an L3 cache, in accordance with one embodiment of the present invention.

FIG. 1 illustrates a system 100 having a data processing system 110 and an external memory 24. Data processing system 110 includes multiple processors, including processor 10, 12, and 14, a system bus 16, an internal memory 20 (e.g. a random access memory (RAM) which is internal to data processing system 110, an L3 cache 18, and an external memory controller 22. Data processing system 110 may include any number of processors, other masters, peripherals, memories, etc. In one embodiment, data processing system 110 is located within a chip or die. System 100 also includes an external memory 24, which is external to data processing system 110 and thus external to the chip or die on which data processing system 110 is located. External memory may be any type of memory, such as any type of non-volatile memory (NVM), and communicates with external memory controller 22 via external bus 26. Note that in alternate embodiments, external memory 24 can be implemented as multiple NVMs, in which multiple buses or a shared bus may be used and controlled by external memory controller 22. In one embodiment, data processing system 110 is on a single integrated circuit, however, in alternate embodiments, some of the memories or peripherals of data processing system 110 may also be on separate integrated circuits. In yet another embodiment, external memory 24 is located on the same chip or die as data processing system 110 and L3 cache 18, but may still be a memory too slow to permit direct access as a backing store and thus still needs a corresponding L3 cache.

Each of processor 10, 12, and 14 can be any type of processor or core or other master, and are each bidirectionally coupled to system bus 16. In one embodiment, a hypervisor on a processor can divide the processor into multiple virtual cores, also referred to as virtual machines or virtual processors. Therefore, a "processor", as used herein, can refer to any one of processors 10, 12, or 14, or may refer to any virtual processor of data processing system 100. Each of the processors of data processing system 110 can access memory 20 via system bus 16 (which may also be referred as a system interconnect). Also, each of processors 10, 12, and 14 may each include their own L1 and L2 caches, which may located internal to the processors or tightly coupled to the processors (i.e. not coupled through system bus 16). However, all processors of data processing system 110 can access external memory 24 by way of L3 cache 18 and external bus 26. Therefore, L3 cache 18 is a shared cache which is a temporary data store for frequently-used information that is needed by data processing system 110, thus reducing the need to access external memory 24 (which is the backing store of L3 cache 18).

When a processor makes an access request to a peripheral or memory of system 100, a requestor ID is provided with the access request which identifies the processor (virtual or not) of data processing system 110 which made the request. For example, a memory access request can either be a read or write access request and includes an access address, control bits (including a read/write indicator), and write data (in the case of a write access request). The memory access requests can be routed via system bus 16 to internal memory 20 or L3 cache 18. The requestor ID for a memory access request can be provided as part of the memory access request on system bus 16 or can be provided separately, such as via sideband signals.

Figure 2:
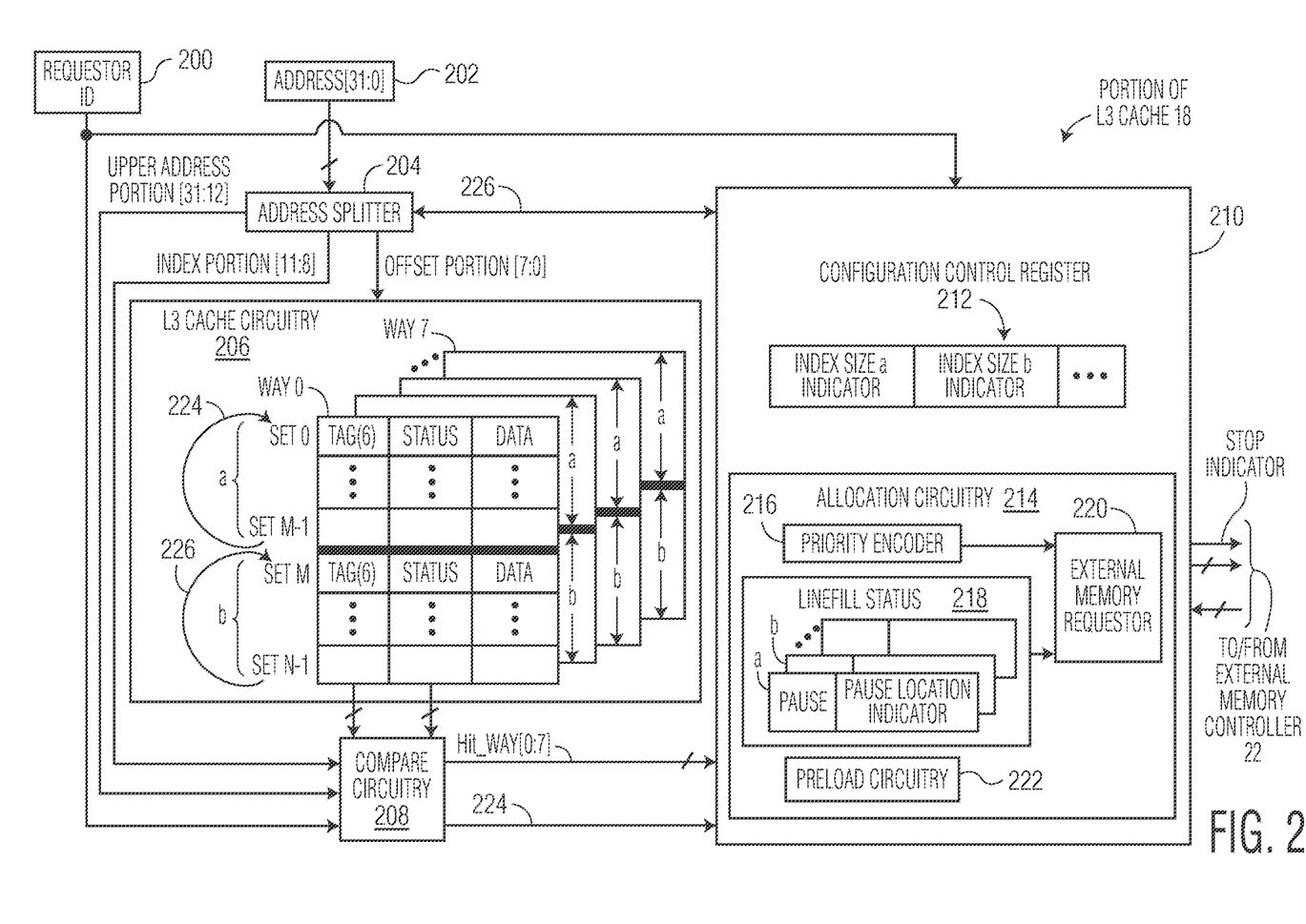
FIG. 2 illustrates, in block diagram form, a portion of the L3 cache of FIG. 1 having L3 cache circuitry, in accordance with one embodiment of the present invention.

FIG. 2 illustrates a portion of L3 cache 18 in accordance with one embodiment. As illustrated, cache 18 is multi-way set-associative cache. Cache 18 may be a unified cache capable of storing multiple types of information, such as instruction or data (e.g. operand) information. Alternatively, it can be configured to store only instruction information or data information. Also, in one embodiment, L3 cache 18 stores non-volatile data. The portion of L3 cache 18 illustrated in FIG. 2 has "N" sets and 8 ways, in which each set has 8 ways. In alternate embodiments, cache 18 may have any number of sets and any number of ways, or may be a direct mapped cache with only one way. Note that, as used herein, a cache line or cache entry refers to an intersection of a cache way and a set.

In the illustrated embodiment, L3 cache circuitry 206 of cache 18 is storage circuitry which stores information in each of a plurality of cache lines or entries. For example, cache circuitry 206 includes tag, status, and cache data. Cache 18 is implement as a slotted cache, also referred to as a divided or split cache, in which cache 18 is divided or split into portions and each portion corresponds to a unique and non-overlapping subset of the cache sets, fewer than N. For example, portion A includes set 0 to set M-1, and portion B includes set M to N-1. Therefore, each portion includes half (i.e. N/2) of the N sets of cache 18. (As will be described below, cache 18 can also be divided into more portions, in which each portion includes a power of 2 number of sets.) Each portion of the slotted cache corresponds to a particular requestor ID. For example, in the illustrated embodiment, it is assumed that the requestor ID 200 identifies one of two requestors in data processing system 110, in which one corresponds to portion A of cache circuitry 206, and the other to portion B of cache circuitry 206. In one embodiment, one bit may be used to distinguish between the two requestor IDs. That bit may be a "0" or "1", in which a requestor ID of "0" corresponds to portion A, and a "1" to portion B. Alternatively, a first requestor ID can be mapped to portion A and a second requestor ID can be mapped to portion B.

As an example, it is assumed N is $2^5$ such that cache circuitry 206 includes 32 sets (i.e. covers 32 different indexes). In the case of cache circuitry 206 not being slotted, an index of 5 bits is needed to select a set among the 32 sets. However, in the case of a slotted (i.e. divided) cache, fewer index bits are needed for each cache portion. For example, for each of portion A or portion B in FIG. 2, which includes only 16 sets, an index of only 4 bits is needed to select a set among the 16 sets. In this manner, the sets of each portion operate similar to a circular buffer, as indicated by circular arrows 224 and 226. For example, 4 bits (from 0b0000-0b1111) can access set 0 to set M-1, and rotating back to set 0 after set M-1, and 4 bits can access set M to set N-1, and rotating back to set M after set N-1. The requestor ID is used to indicate which cache portion the 4-bit index is accessing (portion A or portion B). The information as to the size of the index needed for a cache portion can be stored in a configuration control register 212 within cache control circuitry 210. For example, this control register may include one field for each portion of the cache, in which each field indicates an index size of the cache portion. In the illustrated embodiment, each of index size A indicator and index size B indicator would be 4, indicating a 4-bit index. Alternatively, the fields may store a size of the cache portion from which an index size can be derived.

Address 202 is provided from a processor and has an associated requestor ID 200. Address 202 may be referred to as an access address, and corresponds to either a read access request or a write access request from the corresponding requestor ID. In the illustrated embodiment, address 202 is a 32 bit address, as indicated by the notation [31:0] in which the furthest right bit (at bit location 0, also referred to as bit 0) is the least significant bit and the furthest left bit (at bit location 31, also referred to as bit 31) is the most significant bit.

Address 202 is provided to address splitter 204, which based on information provided via conductors 226 by cache control circuitry 210, splits address 202 into multiple portions, e.g., an upper address portion, an index portion, and an offset portion. In one embodiment, the requestor ID is used to select the appropriate field of configuration control register 212 to provide to address splitter 204 and compare circuitry 208 for the corresponding cache portion. In the illustrated embodiment, the index size is 4 bits for either portion A or B. Therefore, the offset portion corresponds to bits 0-7 of address 202, the index portion to bits 8-11, and the upper address portion to bits 12-31. In this embodiment, the offset portion includes 8 bits, the index portion 4 bits (as indicated by configuration control register 212), and the upper address portion the remaining 20 bits. The index portion and upper address portion are provided to compare circuitry 208. The offset portion is not needed by compare circuitry 208. (Note that in the illustrated embodiment, an offset of 8 bits only is needed due to being a 256 byte line size. Therefore, the line size determines how many LSBs are needed for the offset into the line.)

In a cache, a "hit" or "miss" of an access address is determined by comparing the upper address portion to a stored address portion, referred to as the tag portion. In a set associative multi-way cache which is not slotted, a 5-bit index is used to indicate one of the N sets, and the upper address portion (which would be only 19 bits in this case) is compared to the tag portion stored in each way of the selected set (in which each stored tag is also 19 bits). For example, if set 5 is selected by the 5-bit index, then the upper address portion is compared to the tag portion of each cache entry located at the intersection of each of ways 0-7 with set 5. This produces a hit/miss indicator for each way. Therefore, an 8-bit signal (hit_way[0:7]) is provided by compare circuitry 208 in which a "1" indicates a hit (i.e. match) for the corresponding way, and a "0" indicates a miss (i.e. no match). Note that a hit or match is only indicated if the corresponding status indicators for that cache entry also indicate a valid entry. That is, the match should be qualified by the corresponding valid bit of the cache entry.

In contrast, for the slotted cache of FIG. 2, a smaller index is needed (4 bits vs 5 bits) to identify a set of the N/2 sets of portion A or B. In this case, with each of sets A or B, note that the upper address portion is 20 bits and thus each way stores a larger tag portion (20 bits) as compared to the non-slotted cache. In this example, the requestor ID indicates a partial portion of the cache (e.g. portion A or B), and indicates how many of the most significant bits (MSBs) of the index to use (e.g. 4 bits) for the hit/miss determination. Therefore, compare circuitry 208, depending on the requestor ID, uses the 4-bit index to select a set in portion A or to select a set in portion B. Once the appropriate set in the appropriate portion is selected, then compare circuitry 208 compares the upper address portion [31:12] to the 20-bit stored tag portion to determine a hit or miss with each way. In this example, hit_way[0:7] provides hit/miss indicators for each way of the corresponding portion of cache circuitry 206 (either portion A or portion B), as determined by requestor ID 200. The hit indicators (hit_way[0:7]) are provided to cache control circuitry 210, along with requestor ID 200, for further processing, as will be described below.

Figure 3:
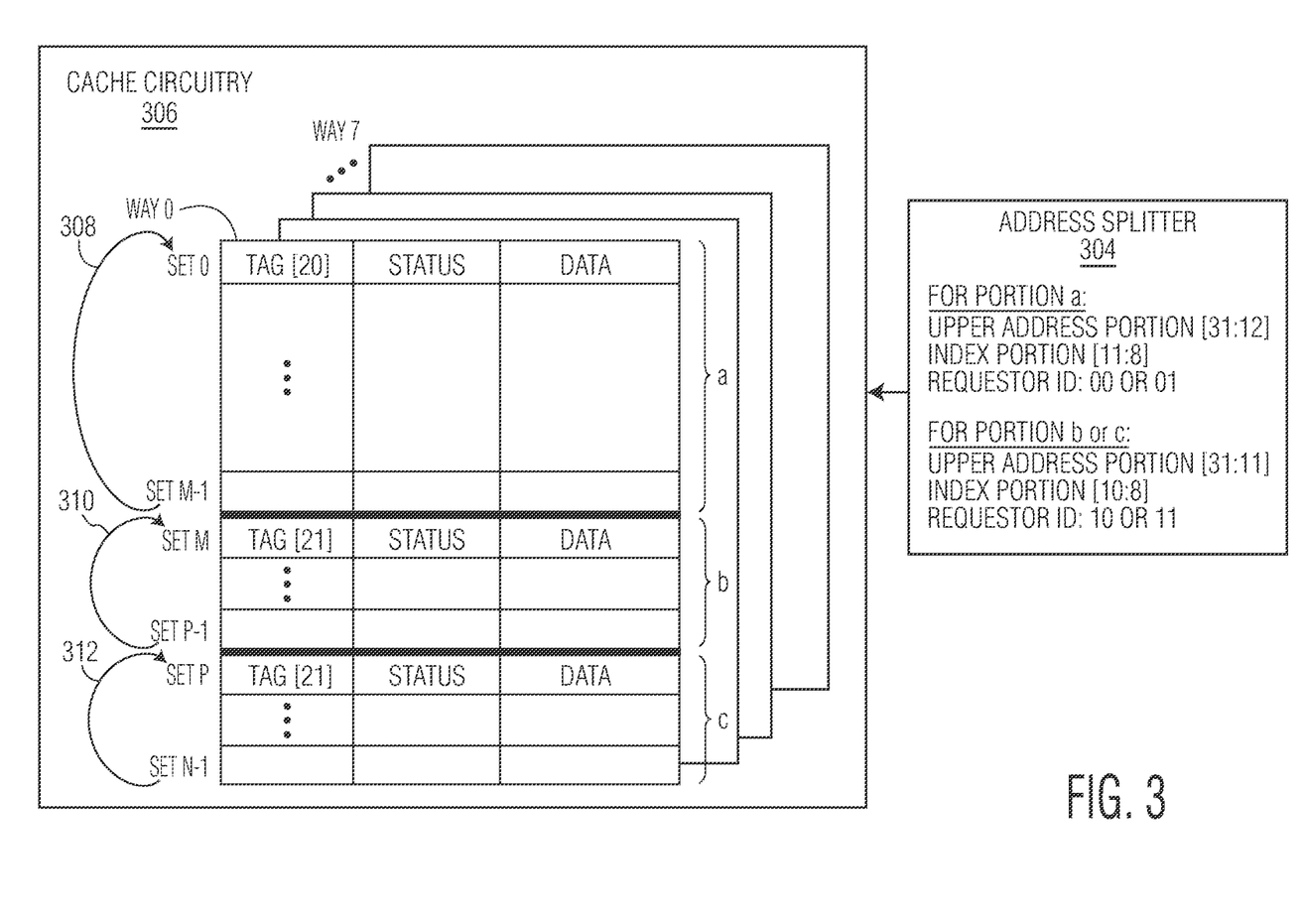
FIG. 3 illustrates, in block diagram form, L3 cache circuitry for the L3 cache of FIG. 1, in accordance with another embodiment of the present invention.

FIG. 3 illustrates cache circuitry 306 which implements a different embodiment for the slotting. Cache circuitry 306, as opposed to being divided into just two portions, is divided into three portions: A, B, and C. Portion A corresponds to half of the cache, which includes set 0 to set M-1, similar to portion A of cache circuitry 226 in FIG. 2. Portions B and C correspond to the other half of cache circuitry 306, in which portion B corresponds to one quarter of the cache, including set M to set P-1, and portion C corresponds to another quarter of the cache, including set P to set N-1. Therefore, M=(N/2)−1 and P=M+(N/4). In the example above in which cache circuitry 306 includes 16 sets such that N=16, portion A corresponds to sets 0-7, portion B corresponds to sets 8-11, and portion C to sets 12-15. As in FIG. 2, the sets of each portion operate similar to a circular buffer, as indicated by arrows 308, 310, and 312, respectively. Therefore, a selected set of sets 0-7 of portion A can be accessed with a 4-bit index, and rotating back to set 0 as in a circular buffer. A selected set of sets 8-11 of portion B can be accessed with just a 3-bit index, and rotating back to set 8 as in a circular buffer, and similarly, a selected set of sets 12-15 can be accessed with a 3-bit index, and rotating back to set 12 as in a circular buffer.

Because there are three portions in the embodiment of FIG. 3, requestor ID 200 may be a two bit value that identifies one of the portions. For example, a requestor ID of 0b00 or 0b01 may indicate portion A (in which the second bit can be treated as a don't care), a requestor ID of 0b10 may indicate portion B, and a requestor ID of 0b11 may indicate portion C. Note that in an alternate embodiment, rather than being a 2-bit value which directly identifies a portion of the cache, requestor ID 200 may be instead mapped to a corresponding two-bit value to identify one of the three portions. In the embodiment of FIG. 3, only 3 index bits are needed to identify a set in each of portions B or C. Therefore, the index portion may correspond to bits[31:11] of address 202, and the index portion to bits[10:8] of address 202. In this case, the bottom two bits of the upper address portion (e.g. bits[12:11]) may correspond to the requestor ID which identifies portion B or C. For portion B or C, note that the stored tag portions are 21 bits rather than 20 bits like portion A. That is, one fewer index bit is needed for each of portions B and C, but a longer upper address portion and stored tag is needed.

For the embodiment of FIG. 3, configuration control register 212 would also include a field for the index size indicator of portion C, and the remainder of cache 18 operates as described above in reference to FIG. 2. For example, for an access request, address splitter 204 provides the appropriate upper address portion and index portion to compare circuitry 208 based on the appropriate index size indicator received from configuration control register 212 via conductors 226 for the current requestor ID. If requestor ID 200 for the access request corresponds to portion A, then operation is as described above with respect to portion A of cache circuitry 226. If requester ID 200 corresponds to portion B, then the 3-bit index portion is used to select one of set M to P-1 for compare circuitry 208 to use to determine hits and misses. In this case, hit_way[0:7] provides a hit indicator for each way in the selected set of portion B. Likewise, if requestor ID 200 corresponds to portion C, then the 3-bit index portion is used to select one of set P to N-1 to for compare circuitry 208 to use to determine hits and misses. In this case, hit_way[0:7] provides a hit indicator for each way in the selected set of portion C.

In one embodiment, address splitter 204 may provide the full 5-bit index portion (for addressing one of the N sets) in which compare circuitry 208 may mask the appropriate bits in order to reduce the 5-bit index to the smaller index, based on the corresponding portion size. Therefore, in one embodiment, compare circuitry 208 may also be coupled to access configuration control register 212 via, for example, conductors 224, to perform the masking.

In this manner, note that the cache circuitry operates in a similar way, regardless of whether the cache is slotted or not, and regardless of the number of cache portions. That is, the slotted aspect of the cache divides the cache into smaller portions, in which the smaller portions can be referred to as "virtual caches," in which each virtual cache operates analogously to each other to determine hits/misses in a corresponding virtual cache as indicated by the requestor ID. By allowing a virtual cache to be accessed by a particular requester, freedom of interference is improved because there is reduced contention of the shared L3 cache if each application or requestor is accessing its own virtual cache.

With cache slotting, each portion or virtual cache uses its own index size, which can vary between the different portions. In general, the index portion of the access address can be identified as address[index_hi:index_lo], in which the index starts at the bit location [index_lo] and ends at the bit location [index_hi]. The full index portion corresponding to address[index_hi:index_lo] may include the number of bits needed to identify one of N sets of the cache, thus without slotting. For example, if the cache has 32 total sets, the full index portion is 5 bits. In this case, the upper portion of the address identified as address[top:index_hi+1] corresponds to the remaining most significant bits of the address after the index, and this upper portion is compared to the stored tags of each way. However, with cache slotting, the request ID is used to identify a portion of the slotted cache. In this case, the higher significant bits of the full index portion correspond to the requestor ID and are considered part of the upper address portion for comparison with the tags.

For example, the higher significant bits of the full index portion can be the requestor ID portion, in which the requestor ID portion corresponds to the received requestor ID (e.g. the requestor ID itself or a bit value mapped to the requestor ID). If the portion of the slotted cache being accessed is half the cache, then only 1 bit is needed for the requestor ID portion, but if the portion of the slotted cache is one quarter the cache, 2 bits are needed for the requestor ID portion. Therefore, for the slotted cache, the full index portion may correspond to the requestor ID portion followed by the index portion used to select a set, in which this index portion is identified by address[index_hi-(# of bits for requestor ID portion):index_lo]. Again, the number of bits for the requestor ID portion depends on the size (number of sets) in the smallest portion. For example, one bit for selecting among half the sets, two bits for selecting among ¼ of the sets, three bits for selecting among ⅛ of the sets, etc. As the number of index bits in the index portion decreases, more bits are used in the comparisons of the upper address portion with the stored tags. That is, the upper address portion identified by address[top: index_hi-(# of bits for requestor ID portion)+1] is used in those comparisons. Referring to the example of cache circuitry 306 of FIG. 3, address[top]=address[31] and the full index portion=address[12:8]. For portion A, the requestor ID portion=address[12], the index portion=address[11:8], and the upper portion to compare with the tags=address[31:12]. For portions B and C, the requestor ID portion=address[12:11], the index portion=address[10:8], and the upper portion to compare with the tags=address[31:11].

While in the above examples of FIGS. 2 and 3, an example of 32 sets is assumed for cache circuitry 206 or 306 when unslotted, resulting in a full index of 5 bits for selecting among the 32 sets, alternate embodiments require a different number of bits in the full index to select among the sets (when unslotted), depending on the cache size. For example, in the above examples, a 64K byte cache is assumed, having a line size of 256 bytes, 8 ways, and 32 sets (in which 256*8*32=64K). However, in alternate embodiments with larger cache sizes, more index bits (e.g. 7 bits) may be required to select among all the sets of the unslotted larger cache. This larger cache can then be divided or slotted in which fewer index bits than 7 can be used for each cache portion, analogous to the examples provided above for the cache portions of FIGS. 2 and 3.

Referring back to FIG. 2, cache control circuitry 210 receives the hit indicators (hit_way[0:7]), and processes the hit or miss. If one of the hit indicators is asserted, the access address hit a cache entry in the appropriate cache portion. For a read, the data from the hit entry is then returned to the requesting processor (e.g. the processor corresponding to the requestor ID 200 provided with the access address). The offset portion of address 202 may be used to provide the desired portion of the cache line which resulted in the hit. For a write, write data provided with the access request is stored in the cache line which resulted in the hit. If none of the hit indicators are asserted, then a miss is indicated for the access address. That is, the access address missed in the cache, meaning that an access to external control memory 24, by way of external memory controller 22 and bus 26, is required to complete the read or write access request.

In response to a miss of a read access request, the access address is provided to external memory controller 22 so that it may access external memory 24 and retrieve the read data stored at the access address. This read data is then returned to the requesting processor. In one embodiment, an entry in L3 cache 18 is also allocated for the access address and corresponding read data. In this manner, a subsequent access to the access address will result in a hit. The allocation in cache 18 is performed in the appropriate portion of the cache, based on the requestor ID corresponding to the access request.

In response to a miss of a write access request, an entry may be allocated into the appropriate portion of cache 18, as indicated by requestor ID 200. Depending on whether the cache is a writeback cache or copyback cache, the access address and write data is immediately provided to external memory controller 22 to be written to external memory 24 or, at a later point in time, provided to external memory controller 22 for updating external memory 24. Note that it is possible that the same data can end up in more than one cache line of a slotted cache. For example, a particular address location can be associated with two requestor IDs and thus end up in a cache line of two different portions of the slotted cache.

Any known algorithm for selecting an entry for allocation (whether an empty or invalid entry is selected or an existing entry is replaced) may be used. Additional circuitry and control may be present in allocation circuitry 214 or cache control circuitry 210 to process the hits and misses and to perform the allocation. In one embodiment, upon a miss in cache 18, a line fill is performed from external memory 24. That is, the read access request may be for data which is sized less than a full entry or full line of cache 18. For example, a cache line may be 8 bytes while the read access request may only be for 1 or 2 bytes (or any number of bytes less than 8). In this case, upon a miss, rather than reading in only the requested data, a full 8 bytes is read in order to fully fill the newly allocated cache line. This is done in hopes that a subsequent access will request data having an address in the same line range as the read access address. Note also that the line fill can be performed in response to a miss in which the access address did not hit in the appropriate cache portion or in response to a data miss in which the access address did hit, but the data was not yet available. In the case of data misses, each byte in cache 18 may have a corresponding status indicator or population indicator to indicate whether the data is valid (i.e. available) or not. For example, the status bits for each cache line may include population bits to indicate which parts of the cache line have been loaded.

Line fills typically require more time because more access cycles are needed to bring in all the data, due, for example, to the width of bus 26 being narrower than the width of a cache line. In one embodiment, a burst read is performed to efficiently obtain the full cache line. Therefore, it is useful for the line size of cache 18 to match an ideal burst length of external memory 24. A line fill may become a problem, though, when another requestor also has a read access request that results in a miss. In this case, it may be necessary for that requestor to wait until the line fill that is already in process from external memory 24 to complete. For higher priority applications, this delay may be unacceptable, especially for requestors executing real time or safety applications. Therefore, in one embodiment, allocation circuitry 214 of cache control circuitry 210 includes a priority encoder 216, in which priorities of different requestor IDs may be stored. Therefore, priority encoder includes storage circuitry and possibly other control circuitry to determine, as to the different requestor IDs in data processing system 110, which requestors have priority over other requestors. If a higher priority requestor has a miss resulting in a cache line fill while a line fill is being performed for a lower priority requestor, allocation circuitry 214 may pause the line fill of the lower priority requestor so as to process the miss and complete the line fill for the higher priority requestor. After the line fill for the higher priority requestor is complete, the line fill of a lower priority requestor can be resumed and completed.

Figure 4:
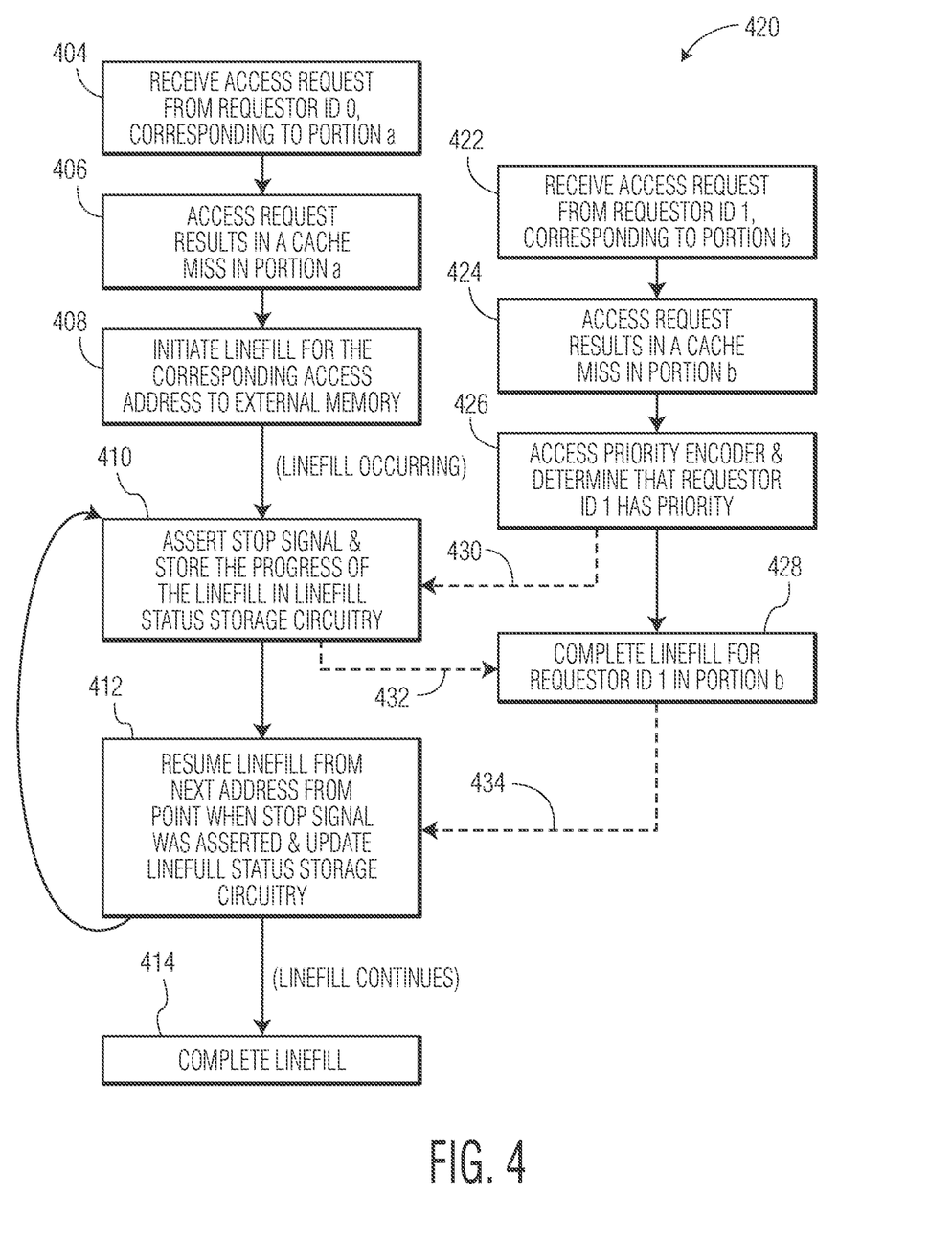
FIG. 4 illustrates, in flow diagram form, operation of applications for different requestors, in accordance with one embodiment of the present invention.

FIG. 4 illustrates, in flow diagram form, operation of applications for different requestors from the perspective of L3 cache 18, in accordance with one embodiment of the present invention. In FIG. 4, method 402 corresponds to the execution of an application from a first requestor having requestor ID 0, and method 420 to the execution of an application from a second request having requestor ID 1. As described above, the requestor ID may include more bits, as needed, depending on the number of requestors in data processing system 110, and each requestor ID may be use directly as the requestor ID portion or mapped to a requestor ID portion when performing a lookup in slotted cache 18. For the example of FIG. 4, it is assumed that requestor ID 1 has higher priority than requestor ID 0. Note that there may also be other requestors, in which priority encoder 216 keeps track of the relative priorities of all the requestors in data processing system 110.

Method 402 begins before method 420, and begins in block 404 in which an access request is received from requestor ID 0, which corresponds to portion A of cache 18. In block 406, the access request results in a cache miss in portion A. In response to the cache miss, a line fill to portion A of cache 18 is initiated. For example, external memory requestor 220 provides read requests for the line fill to external memory controller 22 which then communicates with external memory 24. For example, external memory controller 22 may implement the line fill as a burst read from external memory 24. The data required for the cache miss is returned along with additional data for the line fill. In one embodiment, the data for the cache miss may be the first data returned, or alternatively, it may be returned during the middle of the line fill, depending on how the line fill is performed. The received data for the cache miss is returned by cache control circuit 210 to processor corresponding to requestor ID 0, and as the data for the line fill is received, it is stored into an allocated entry in portion A of cache 18.

At some point in time, after the access request is received from requestor ID 0, method 420 begins in block 422 in which an access request is received from requestor ID 1, which corresponds to portion B of cache 18. In block 424, the access request results in a cache miss in portion B. In response to the cache miss, since a line fill is already in progress by external memory requestor 220 for the cache miss for requestor ID 0, priority encoder 216 is accessed to determine the priority of requestor ID 1 versus the priority of requestor ID 0. In block 426, it is determined that requestor ID 1 has priority. Due to this determination, external memory requestor 220 requests a pause of the currently occurring line fill (as indicated by dashed arrow 430). In response to this pause request, in block 410 of method 402, external memory requestor asserts the stop indicator which is provided to external memory controller 22. External memory controller 22 then stops the line fill from external memory 24. In addition, in block 410, the progress of the line fill that is paused is stored in line fill status storage circuitry 218 in the storage circuitry portion which corresponds to portion A of cache 18 (i.e. assigned to requestor ID 0). In the line fill status register labeled "A", the pause indicator is asserted and a pause location indicator is stored. The pause location indicator provides an indication of how much of the line fill has been performed, e.g., the number of bytes which have already been transferred and stored in portion A of cache 18 for the paused line fill. (This may be determined using the status or population bits for each byte in the line which was being loaded.) Therefore, from the perspective of external memory 24, the line fill is stopped, but allocation circuitry 214 implements a pause of the line fill which will subsequently be continued and completed. Note that the line fill for requestor ID 0 is paused on a sub-line boundary which is less than a full burst size.

After the line fill status is stored and the stop signal is asserted, acknowledgment is provided from external memory controller 22 indicating that the line fill has stopped and thus bus 26 is free. This acknowledgment is illustrated in FIG. 4 by dashed arrow 432 returning back to method 420. In block 428 of method 420, the line fill for the cache miss of the higher priority requestor ID 1 is completed in portion B of cache 18. In one embodiment, this line fill is loaded using a wraparound address model so that the first requested word is immediately available to return to the processor corresponding to requestor ID 1. Upon completion of the line fill, as indicated by dashed arrow 434, method 400 continues with block 412 in which the line fill is again resumed from the next address from the point at which the stop signal was asserted. This information is obtained from the pause location indicator from the line fill status storage circuitry labeled "A". The pause indicator itself in that status storage circuitry is also negated. In this manner, the line fill continues. If no other interruption of the line fill occurs, the line fill is completed in block 414. However, note that while the line fill is still occurring, another cache miss from a higher priority requestor may again occur in which the line fill in response to the cache miss for requestor ID 0 is again paused, in which method 400 would again return to block 410.

After the line fill for requestor ID 1 in portion B is completed, instead of resuming the line fill for requestor ID 0, another paused line fill may be instead resumed for another processor corresponding to a requestor that has a higher priority than requestor ID 0. After the line fill for that higher priority requestor is completed, the paused line fill for requestor ID 1 can be continued and eventually completed.

The ability to pause and resume line fills may improve efficiency of operation for data processing system 110 in various situations, such as the example of FIG. 4, as well as in miss-under-miss situations. In a miss-under-miss situation, a line fill may be initiated and return a first word of the line to fulfill the cache miss, and immediately after the return of the first word, a request is received for a second word of the line. In this situation, the line fill can be paused to give cache control circuitry 210 the opportunity to return the second word to the requesting processor before having to wait for the full line fill to finish. Note that, in a hit-under-miss, a hit is allowed to process during the time delay caused while a miss is being processed. Therefore, in addition to supporting these hit-under-miss situations, the line fill pause/resume aspect allows for improved support for miss-under-miss situations.

In one embodiment, when external memory requestor 220 indicates that no one is accessing external memory 24, a next logical line can be allocated into a corresponding portion of cache 18. In this case, preload circuitry 222 can determine the portion of cache 18 belonging to the highest priority requestor (as indicated by priority encoder 216). Preload circuitry 222 can then pre-load a next logical line from external memory 24, following, for example, the most recent line fill. This may be especially beneficial for safety applications.

Therefore, by now it can be understood how the use of a slotted cache, in which the cache is divided into portions corresponding to different processors of a data processing system (and thus to different applications), improved freedom of interference can be achieved. Also, through the use of the line fill pause and resume aspect, real-time and safety applications (and thus their corresponding cache portions) can be given priority by allowing line fills to the corresponding cache portions to occur out of order. In this manner, a single shared cache can be efficiently shared among multiple requestors while still providing improved freedom of interference. Furthermore, preloading can also be used for priority portions of the slotted cache for improved efficiency.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. In alternate embodiments, any bus may be implemented as a cross-bar switch or fabric of conductors. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. Similarly, brackets can also be used to indicate the bit locations of a signal value, such as "signal [0:7]" indicating a 7-bit signal. The symbol "$" preceding a number indicates that the number is represented in its hexadecimal or base sixteen form. The symbol "%" or "0b" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the information in configuration control register 222 of line fill status storage circuitry 218 may be represented or stored in a variety of different ways and formats. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a data processing system includes a first processor; a second processor; a cache configured to be shared by the first processor and the second processor, the cache having N sets, each set including a plurality of cache lines, wherein N is any integer greater than or equal to two, and each cache line is configured to store a tag, at least one status bit, and corresponding cache line data; and a memory controller configured to communicate with a shared memory, the shared memory corresponding to a backing store for the cache. The cache is divided into a first cache portion corresponding to a first requestor identifier (ID) and a second cache portion corresponding to a second requestor ID, in which the first cache portion and the second cache portion each include a unique and non-overlapping subset of the N sets, in which the first cache portion is accessed in response to memory access requests associated with the first requestor ID, and the second cache portion is accessed in response to memory access requests associated with the second requestor ID. A corresponding requestor ID is received with each memory access request, and each memory access request includes a corresponding access address identifying a memory location in the shared memory and a corresponding index portion, wherein each corresponding index portion selects a set in a selected cache portion of the first and second cache portions selected based on the received corresponding requestor ID, in which each corresponding index portion includes fewer than $2^N$ bits. In one aspect of this embodiment, each cache portion includes a power of 2 number of sets. In another aspect, the second cache portion corresponding to the second requestor ID includes fewer sets than the first cache portion corresponding to the first requestor ID, in which an index portion of an access address of a memory access request from the second processor includes fewer bits than an index portion of an access address of a memory access request from the first processor. In a further aspect, each of the stored tags in cache lines of the first cache portion includes more bits than each of the stored tags in cache lines of the second cache portion. In another aspect, the data processing system further includes storage circuitry configured to store an index size indicator for each cache portion of the cache; and an address splitter coupled to the storage circuitry and configured to provide, from a first received access address, a first upper address portion and a first index portion based on the index size indicator for a first selected cache portion which is selected based on a requestor ID corresponding to the first received access request. In a further aspect, the data processing system further includes compare circuitry coupled to receive the first upper address portion and the first index portion and configured to compare the first upper address portion with a stored tag in a set of the first selected cache portion which is indicated by the first index portion to determine a hit or miss in the cache. In yet a further aspect, a subset of the first upper address portion includes one or more bits mapped from the requestor ID corresponding to the first received access request. In another further aspect, a subset of the first upper address portion includes the requestor ID corresponding to the first received access request. In yet another further aspect, the cache is further characterized as a set-associative multi-way cache, wherein the compare circuitry is configured to compare the first upper address portion with a stored tag in the indicated set of the first selected cache portion at each way of the cache to determine a hit or miss in each way of the cache. In another aspect of the above embodiment, each of the first and second processors are virtual processors. In another aspect, the cache further includes allocation circuitry which includes a priority encoder and line fill status storage circuitry, wherein the allocation circuitry is configured to: in response to a read access request from the first processor missing in the cache, initiating a line fill from the shared memory into an allocated cache line in the first portion of the cache; in response to a subsequent read access request from the second processor missing in the cache and determining from the priority encoder that the second processor has priority over the first processor, pausing the line fill to the allocated cache line in the first portion of the cache; and prior to completing the line fill to the allocated cache line in the first portion of the cache, completing a line fill from the shared memory into an allocated cache line in the second portion of the cache. In a further aspect, the allocation circuitry is further configured to: after completing the line fill from the shared memory into an allocated cache line in the second portion of the cache, resuming a line fill corresponding to a processor having a lower priority than the second processor. In another further aspect, the line fill storage circuitry is configured to store a pause indicator to indicate that the line fill to the allocated line in the first portion of the cache is paused and to store a pause location indicator for the line fill to the allocated line in the first portion of the cache which indicates what portion of the line fill has been completed. In a further aspect, the one or more status bits of the allocated line in the first portion of the cache includes a bit for each byte in the corresponding cache line data of the allocated line in the first portion that is valid.

15. In another embodiment, in a data processing system having a plurality of requestors, a cache having N sets and shared by the plurality of processors, and a memory controller configured to communicate with a shared memory which operates as a backing store for the cache, wherein the cache is divided into a plurality of cache portions, each portion corresponding to a requestor of the plurality of requestors and including a unique and non-overlapping subset of the N sets, a method includes receiving, by the cache, a memory access request and a corresponding requestor identifier (ID) which identifies one of the plurality of requesters which provided the memory access request, wherein the memory access request includes an access address which identifies a location in the shared memory; providing an index portion from the access address to identify a set from a selected cache portion of the cache, in which the selected cache portion is selected from the plurality of cache portions based on the corresponding requestor ID, wherein the index portion is fewer than $2^N$ bits, and a number of bits of the index portion is selected based on the corresponding requestor ID; and using a remaining upper portion of the access address in a comparison with a stored tag of the identified set to determine a hit or miss of the access address in the selected cache portion. In one aspect of the another embodiment, the method further includes receiving, by the cache, a second memory access request and a corresponding second requestor ID which identifies another requestor of the plurality of requesters which provided the second memory access request, wherein the second memory access request includes a second access address which identifies a second location in the shared memory; providing a second index portion from the second access address to identify a second set from a selected second cache portion of the cache, in which the selected second cache portion is selected from the plurality of cache portions based on the corresponding second requestor ID, wherein the second index portion is fewer than $2^N$ bits, and the index portion includes a different number of bits than the second index portion; and using a remaining second upper portion of the second access address in a second comparison with a second stored tag of the identified second set to determine a hit or miss of the second access address in the selected second cache portion, wherein the upper portion of the first access address includes a different number of bits than the second upper portion of the second access address, and the stored tag includes a different number of bits than the second stored tag. In a further aspect, prior to receiving the second memory access request, the method includes determining that the memory access request results in a miss in the selected cache portion; and initiating a line fill from the shared memory to a first newly allocated cache line within the selected cache portion. In yet a further aspect, the second memory access request is received after initiating the line fill to the first newly allocated cache line, but prior to completing the line fill to the first newly allocated cache line, the method further includes determining that the second memory access request results in a miss in the selected second cache portion; determining that the second requestor has a higher priority than the first requestor; pausing the line fill to the newly allocated cache line within the selected cache portion; and completing a line fill to a newly allocated cache line within the selected second cache portion. In yet a further aspect, the method further includes, after completing the line fill to the newly allocated cache line within the selected second cache portion, resuming the line fill to the newly allocated cache line within the selected cache portion, wherein in response to the pausing the line fill to the newly allocated cache line within the selected cache portion includes providing a stop indicator to the memory controller to stop the line fill to the newly allocated cache line within the selected cache portion, and storing a location indicator which indicates how much of the line fill to the newly allocated cache line within the selected cache portion has been completed, wherein the resuming the line fill to the newly allocated cache line within the selected cache portion is performed using the location indicator. In another aspect, the remaining upper portion of the access address includes one or more bits which maps to the corresponding requestor ID.

What is claimed is:

1. A data processing system comprising:
   a first processor;
   a second processor;
   a cache configured to be shared by the first processor and the second processor, the cache having N sets, each set including a plurality of cache lines, wherein N is any integer greater than or equal to two, and each cache line is configured to store a tag, at least one status bit, and corresponding cache line data, wherein:
      the cache is divided into a first cache portion corresponding to a first requestor identifier (ID) and a second cache portion corresponding to a second requestor ID, the first cache portion and the second cache portion each including a unique and non-overlapping subset of the N sets, in which the first cache portion is accessed in response to memory access requests associated with the first requestor ID, and the second cache portion is accessed in response to memory access requests associated with the second requestor ID;
   a memory controller configured to communicate with a shared memory, the shared memory corresponding to a backing store for the cache;
   wherein a corresponding requestor ID is received with each memory access request, and each memory access request includes a corresponding access address identifying a memory location in the shared memory and a corresponding index portion, wherein each corresponding index portion selects a set in a selected cache portion of the first and second cache portions selected based on the received corresponding requestor ID, in which each corresponding index portion includes fewer than $2^N$ bits.

2. The data processing system of claim 1, wherein each cache portion includes a power of 2 number of sets.

3. The data processing system of claim 1, wherein the second cache portion corresponding to the second requestor ID includes fewer sets than the first cache portion corresponding to the first requestor ID, and wherein an index portion of an access address of a memory access request from the second processor includes fewer bits than an index portion of an access address of a memory access request from the first processor.

4. The data processing system of claim 3, wherein each of the stored tags in cache lines of the first cache portion includes more bits than each of the stored tags in cache lines of the second cache portion.

5. The data processing system of claim 1, further comprising:
   storage circuitry configured to store an index size indicator for each cache portion of the cache; and
   an address splitter coupled to the storage circuitry and configured to provide, from a first received access address, a first upper address portion and a first index portion based on the index size indicator for a first selected cache portion which is selected based on a requestor ID corresponding to the first received access request.

6. The data processing system of claim 5, further comprising:
   compare circuitry coupled to receive the first upper address portion and the first index portion and configured to compare the first upper address portion with a stored tag in a set of the first selected cache portion which is indicated by the first index portion to determine a hit or miss in the cache.

7. The data processing system of claim 6, wherein a subset of the first upper address portion includes one or more bits mapped from the requestor ID corresponding to the first received access request.

8. The data processing system of claim 6, wherein a subset of the first upper address portion includes the requestor ID corresponding to the first received access request.

9. The data processing system of claim 6, wherein the cache is further characterized as a set-associative multi-way cache, wherein the compare circuitry is configured to compare the first upper address portion with a stored tag in the indicated set of the first selected cache portion at each way of the cache to determine a hit or miss in each way of the cache.

10. The data processing system of claim 1, wherein each of the first and second processors are virtual processors.

11. The data processing system of claim 1, wherein the cache further comprises allocation circuitry which includes a priority encoder and line fill status storage circuitry, wherein the allocation circuitry is configured to:
- in response to a read access request from the first processor missing in the cache, initiating a line fill from the shared memory into an allocated cache line in the first portion of the cache;
- in response to a subsequent read access request from the second processor missing in the cache and determining from the priority encoder that the second processor has priority over the first processor, pausing the line fill to the allocated cache line in the first portion of the cache; and
- prior to completing the line fill to the allocated cache line in the first portion of the cache, completing a line fill from the shared memory into an allocated cache line in the second portion of the cache.

12. The data processing system of claim 11, wherein the allocation circuitry is further configured to:
- after completing the line fill from the shared memory into an allocated cache line in the second portion of the cache, resuming a line fill corresponding to a processor having a lower priority than the second processor.

13. The data processing system of claim 11, wherein the line fill status storage circuitry is configured to store a pause indicator to indicate that the line fill to the allocated line in the first portion of the cache is paused and to store a pause location indicator for the line fill to the allocated line in the first portion of the cache which indicates what portion of the line fill has been completed.

14. The data processing system of claim 13, wherein the one or more status bits of the allocated line in the first portion of the cache includes a bit for each byte in the corresponding cache line data of the allocated line in the first portion that is valid.

15. In a data processing system having a plurality of requestors, a cache having N sets and shared by the plurality of requestors, and a memory controller configured to communicate with a shared memory which operates as a backing store for the cache, wherein the cache is divided into a plurality of cache portions, each portion corresponding to a requestor of the plurality of requestors and including a unique and non-overlapping subset of the N sets, a method comprising:
- receiving, by the cache, a memory access request and a corresponding requestor identifier (ID) which identifies one of the plurality of requesters which provided the memory access request, wherein the memory access request includes an access address which identifies a location in the shared memory;
- providing an index portion from the access address to identify a set from a selected cache portion of the cache, in which the selected cache portion is selected from the plurality of cache portions based on the corresponding requestor ID, wherein the index portion is fewer than $2^N$ bits, and a number of bits of the index portion is selected based on the corresponding requestor ID; and
- using a remaining upper portion of the access address in a comparison with a stored tag of the identified set to determine a hit or miss of the access address in the selected cache portion.

16. The method of claim 15, further comprising:
- receiving, by the cache, a second memory access request and a corresponding second requestor ID which identifies another requestor of the plurality of requesters which provided the second memory access request, wherein the second memory access request includes a second access address which identifies a second location in the shared memory;
- providing a second index portion from the second access address to identify a second set from a selected second cache portion of the cache, in which the selected second cache portion is selected from the plurality of cache portions based on the corresponding second requestor ID, wherein the second index portion is fewer than $2^N$ bits, and the index portion includes a different number of bits than the second index portion; and
- using a remaining second upper portion of the second access address in a second comparison with a second stored tag of the identified second set to determine a hit or miss of the second access address in the selected second cache portion, wherein the upper portion of the first access address includes a different number of bits than the second upper portion of the second access address, and the stored tag includes a different number of bits than the second stored tag.

17. The method of claim 16, wherein prior to receiving the second memory access request, the method comprises:
- determining that the memory access request results in a miss in the selected cache portion; and
- initiating a line fill from the shared memory to a first newly allocated cache line within the selected cache portion.

18. The method of claim 17, wherein the second memory access request is received after initiating the line fill to the first newly allocated cache line, but prior to completing the line fill to the first newly allocated cache line, the method further comprising:
- determining that the second memory access request results in a miss in the selected second cache portion;
- determining that the second requestor has a higher priority than the first requestor;
- pausing the line fill to the newly allocated cache line within the selected cache portion; and
- completing a line fill to a newly allocated cache line within the selected second cache portion.

19. The method of claim 18, further comprising, after completing the line fill to the newly allocated cache line within the selected second cache portion, resuming the line fill to the newly allocated cache line within the selected cache portion, wherein in response to the pausing the line fill to the newly allocated cache line within the selected cache portion includes:
- providing a stop indicator to the memory controller to stop the line fill to the newly allocated cache line within the selected cache portion, and storing a location indicator which indicates how much of the line fill to the newly allocated cache line within the selected cache portion has been completed, wherein the resuming the line fill to the newly allocated cache line within the selected cache portion is performed using the location indicator.

20. The method of claim 15, wherein the remaining upper portion of the access address includes one or more bits which maps to the corresponding requestor ID.

* * * * *